United States Patent [19]

Junginger

[11] Patent Number: 5,258,582
[45] Date of Patent: Nov. 2, 1993

[54] APPARATUS AND METHOD FOR WEIGHING AIRCRAFT

[76] Inventor: Hilbert Junginger, 1904 Burning Tree La., Denton, Tex. 76201

[21] Appl. No.: 722,595

[22] Filed: Jun. 27, 1991

[51] Int. Cl.$^5$ .................. G01G 19/10; G01G 5/04; G01L 1/02
[52] U.S. Cl. ................... 177/141; 177/208; 73/862.581
[58] Field of Search ............... 177/136, 141, 208; 73/862.58

[56] References Cited

U.S. PATENT DOCUMENTS

| | | |
|---|---|---|
| 3,473,369 | 10/1969 | Garrison . |
| 3,513,300 | 5/1970 | Elfenbein et al. . |
| 3,581,836 | 6/1971 | Segerdahl et al. ............... 177/1 |
| 3,584,503 | 6/1971 | Senour . |
| 3,652,040 | 3/1972 | Hartel ............... 177/141 X |
| 3,701,279 | 10/1972 | Harris et al. . |
| 3,797,302 | 3/1974 | Laimins . |
| 3,802,523 | 4/1974 | Clark ............... 177/141 X |
| 4,007,894 | 2/1977 | Hartel ............... 177/141 X |
| 4,385,527 | 5/1983 | Raskin . |
| 4,463,428 | 7/1984 | Gilliam . |
| 4,490,802 | 12/1984 | Miller . |
| 4,494,210 | 1/1985 | Miller . |
| 4,502,555 | 3/1984 | Gower . |
| 4,507,742 | 3/1985 | Bateman . |
| 4,700,910 | 10/1987 | Brady . |
| 4,702,438 | 10/1987 | Levy et al. . |
| 4,836,308 | 6/1989 | Davis et al. . |

*Primary Examiner*—George H. Miller, Jr.
*Attorney, Agent, or Firm*—Hubbard, Thurman, Tucker & Harris

[57] ABSTRACT

A measurement device (10) is disclosed that uses the actual hydraulic cylinders of the aircraft landing gear to weigh the aircraft. The device (10) comprises a pressure-weigh sensitive transducer (12) with a flow-through passage (14) and adaptors (20a, 20b) to attach the device to the standardized service valve on the aircraft landing gear. The transducer (12) measures the pressure in the landing gear's hydraulic cylinder. This measurement signal is converted into an aircraft weight and center of gravity location. These determinations are displayed on a converter/display (50). The transducer (12) has a flow-through passage (14) to allow servicing of the landing gear's hydraulic cylinder.

5 Claims, 1 Drawing Sheet

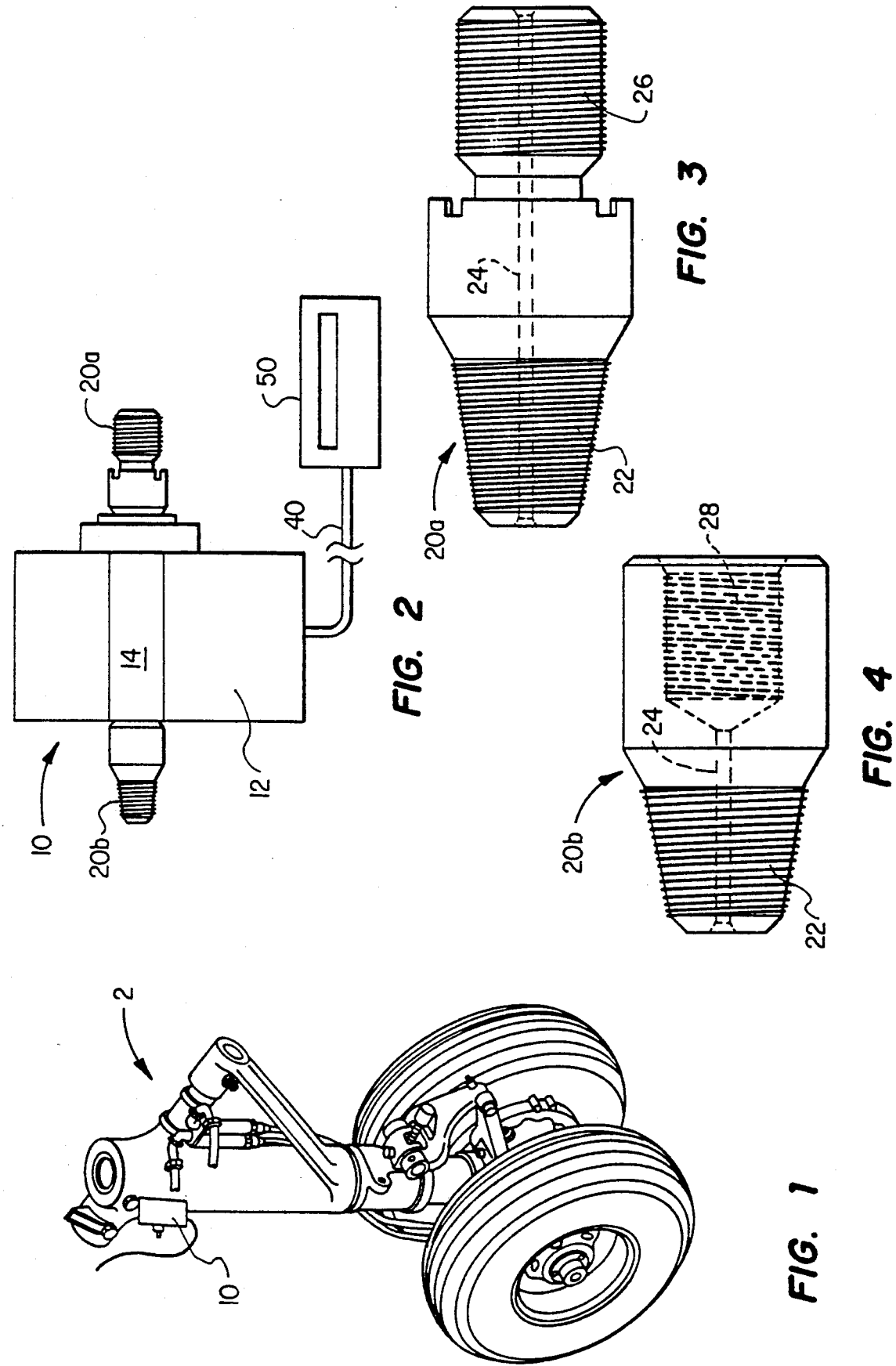

APPARATUS AND METHOD FOR WEIGHING AIRCRAFT

TECHNICAL FIELD OF THE INVENTION

The present invention relates to an apparatus and method for weighing aircraft. In particular, the invention relates to measurement of the hydraulic pressure in the aircraft's landing gear with a modified transducer and converting this pressure measurement into an aircraft weight.

BACKGROUND OF THE INVENTION

Knowing the weight of an aircraft and its center of gravity are of critical importance to a pilot. A plane's weight impacts flight performance, fuel usage, cargo capacity, and even landing fees at an airport. The Federal Aviation Administration (FAA) also regulates the allowed weight of an aircraft with takeoff requirements and load limits.

In the past, weight and center of gravity determination was a long and laborious procedure. It typically required jacking the aircraft at several points through load cells or towing the aircraft onto properly arranged weighing scales. For example, U.S. Pat. No. 4,502,555 to Gower discloses a portable weighing system for aircraft which includes a plurality of load cells which are connected to a central computing and display unit. The computer within the central unit compensates by its programming for nonlinearities in the response of the load cells. The output display can include aircraft gross weight and center of gravity as a percentage of mean aerodynamic chord (MAC).

U.S. Pat. No. 3,797,302 to Laimins discloses an onboard aircraft weight transducer with mechanical offset adjustment. This externally mounted strain-gage transducer senses an aircraft's weight by measuring load-induced deformations of a support such as an axle, truck beam, or the like. The device comprises an elongated form with end lugs designed for bolting to cooperating horizontally-spaced lugs integral within the support. The transducer end lugs each are provided with an adjustably-deformable hole-and-slot type symmetrical flexural connection by which the transducer ends may be raised or lowered in the vertical direction.

A need exists for a method and apparatus for weighing aircraft which does not rely on gages which measure structural deformation. A need exists for a device capable of easy installation which measures the hydraulic pressure in the landing gear of the aircraft and which can correlate this measurement to an aircraft weight and center of gravity location. This device should further incorporate a display unit for the operator or the pilot which will warn him of underload and overload conditions, or a situation where the center of gravity of the plane is located such that flying would be unsafe.

SUMMARY OF THE INVENTION

The present system is comprised of a feed-through or tee-type transducer that is attached to the service valve opening or similar service opening within the aircraft's landing gear. Thus, no additional holes or entry ports are needed to enter the hydraulic and/or gas operated cylinders to obtain readings. The inention may be used in the service valve opening designed in the aircraft originally. The system will use a computerized electronic system incorporating an internal alarm which warns the pilot or operator of irregular or dangerous center of gravity distribution, or unsafe weight loads. Each landing gear's transducer is designed to generate electrical signal representative of the aircraft weight at the landing gear location, and send the signal to the converter/display unit.

The aircraft weight plus the known weight of the landing gear can be used to obtain a total weight, since all components within the aircraft have known weights. When in doubt as to the reliability of the invention due to the landing wheels and instrumentation attached to and below the point readings are taken from, the aircraft may be weighted before attaching the unit. This will enable the pilot or operator to add the landing wheel weight force that exists below the hydraulic cylinder. Thus, the pilot or operator will have accurate readings anytime the aircraft contacts the ground surface. With the exception of wear on the tires, which should not be a limiting factor, the total aircraft weight will be accurate. The system is designed to enable the operator to find the amount of fuel expended in flight, as well as ascertain weight of passengers, cargo or baggage. This invention may also be used on skid-type of aircraft, as long as there are hydraulic and/or gas operated cylinders in the landing gear.

The system can be utilized on many different types of aircraft, as it is capable of adjusting to each aircraft's characteristic features. This means that internal reference points signifying an overload of weight or improper weight distribution can be determined which will engage an audio or visual alarm on the readout system of the converter/display unit. The aircraft weight alarm can be set at a minimum or maximum load. The purpose is to warn and alert the pilot or operator of any underload or overload of the aircraft, either with or without fuel, cargo, baggage, or passengers. This unit will not be used during flight, and may be disengaged while the aircraft is in flight. The unit is not normally used in any position except when loading the aircraft or checking variance in weight while the aircraft is on the ground. This safety feature ensures that the air-worthiness of the aircraft is unaffected during flight.

The system will have the capability of change due to the fact that there are set points on the readout system that can be changed for different types of aircraft. This means that internal alarms due to overloads of weights can be determined and set into the readout system of this on-board computer. The aircraft weight alarm can be set at a minimum or maximum load. The purpose is to warn and alert the pilot or operator of any underload or overload of the aircraft, with fuel, cargo, baggage, or passengers. This unit will not be in use during flight, and may be turned off while the aircraft is not on the ground. This means that the unit is not necessary to be used in any position but for loading the aircraft or checking variance in weight on the ground. This is a safety feature in the fact that the air-worthiness will not be affected on way or the other in flight.

BRIEF DESCRIPTION OF THE DRAWINGS

For a more complete understanding of the present invention, and for further details and advantages thereof, reference is now made to the following Detailed Description taken in conjunction with the accompany drawings, in which:

FIG. 1 is an elevational view of the service valve location on a typical aircraft landing gear;

FIG. 2 is a partial sectional view of the present invention;

FIG. 3 is a detail sectional of a first connector element; and

FIG. 4 is a detail sectional of a second connector element.

DETAILED DESCRIPTION

The present invention is a method and apparatus for weighing an aircraft or any other suitable object. Referring to FIGS. 1 and 2, a device 10 embodying the present invention is disclosed. Device 10 comprises a transducer portion 12, a first entry 20b (not shown), a service valve connection 20a (not shown), a conductor 40 and a converter/display 50.

The invention will be easier to understand by noticing that the service valve opening 4 (not shown) of the landing gear 2, shown in FIG. 1, will be the entry point of the tee-type or feed-through transducer which verifies the pressure inside the hydraulic cylinder. The transducer's tee-type fitting will not affect the use of the service valves of the landing gear, as the valve may be attached to the device 10 itself. The transducer can stay in place indefinitely due to the fact that the aircraft's landing gear may be serviced without removal of the weighing apparatus. The only time this invention would be removed is for replacement or teardown of the landing gear itself for maintenance purposes. This invention would be an on-board unit that does not interface with the operation of the aircraft once the aircraft is airborne.

Referring to FIG. 2, the device 10 is shown to include a pressure-sensitive transducer 12 with a flow-through passage 14. The transducer 14 has a broad operation range. In a preferred embodiment, the transducer would utilize an input voltage of either 12 volts DC or 24 volts DC at a current of 40 mA. The output current is preferably between 4-20 mA. The operational temperature range can be between $-40°$ to $160°$ F. A transducer meeting these preferred requirements would be the Model NTT-012-4 and Model NTT-012-5 Industrial Thrutube Transducers by EiSPAN of Plano, Tex. Unlike most transducers, these units an sense either voltage or current potentials to determine the necessary signals used by the converter/display unit. The through-tube portion 14 has a first end and a second end, both typically with female heads.

FIGS. 3 and 4 illustrate adapters necessary to attach the pressure-sensitive transducer 12 to the service valve of the landing gear and any necessary servicing devices. FIG. 3 illustrates that adaptor 20a is used between transducers 12 (not shown) and the landing gear service valve. Adaptor 20a has a male threaded end 22 to engage a first end of through-tube portion 14 (not shown), and a male-threaded end 26 to engage the service valve. FIG. 4 illustrates that adaptor 20b has a male-threaded end 22 to engage the second end of through-tube 14 and a female-threaded end 28 to engage any device designed to engage the service valve. Both adaptors 20a and 20b have a central passage 24. In operation, the signal generated by transducer 12 is carried via conductor 40 to converter/display 50, as shown in FIG. 2. The converter/display 50 is preferably capable of reading at least one analog input. A microprocessor within said convert/display 50 should be capable of computing average value, peak and minimum values over a time specified by the user. Additionally, the converter/display 50 should be able to take an input signal and correlate this signal into a weight value. An alarm feature on said convert/display 50 should be programmable to signal an underweight condition, an overweight condition, or unsafe condition due to an unsafe center of gravity. A suitable display/converter is the model LR-300 Multi-Channel Display/Controller by EiSPAN of Plan, Tex. The device 10 may be calibrated for all types of aircraft and may be adjusted or calibrated to all types of hydraulic or gas landing gears. The device 10 may be recalibrated and used other aircraft if necessary, and also be calibrated routinely to assure its operational accuracy. The device 10 may be designed to disengage while the aircraft is in flight.

A method of using this apparatus involves several steps. First, the pressure-sensitive transducer 12 must be attached to the service valve of the landing gear with adaptor 20a. Second, the signal generated by the transducer 12 representing the aircraft weight must be conveyed to the converter/display 50. Third, the transducer's signal must be converted into an airplane weight which is readily understood by the pilot or operator. If one transducer is used on each landing gear, then each signal is typically added with the others by the converter/display 50 to determine the total weight of the aircraft. Fourth, the converter/display will utilize the various signals to define a formula which correlates the signal's location to determine the center of gravity to the aircraft. Finally, the generated values are displayed to the user of pilot by the converter/display 50. If the values are above or below a preset limit, then an audible or visual alarm will sound a warning, thereby notifying a pilot or operator of an unsafe condition due to the aircraft's weight characteristics.

In sum, the device 10 may be easily attached to a standard service valve located on each landing gear of an aircraft. The device 10 measures the pressure within the landing gear and converts this pressure reading into a weight and/or a center of gravity location. Moreover, the signals generated by device 10 can be displayed in many useful formats to the pilot or user. This device also allows flow-through servicing of the landing gear, making routine maintenance of the landing gear easier, as the weighing apparatus does not have to be removed.

While one embodiment of the present invention has been illustrated in the accompanying drawings, and described in the foregoing detailed description, it will be understood that the invention is not limited to the embodiment disclosed, but is capable of numerous rearrangements, modifications and substitutions of parts and elements without departing from the spirit of the invention.

I claim:

1. An apparatus for use in weighing an aircraft with landing gear with at least one hydraulic cylinder incorporated into said landing gear, comprising:

(a) at least one pressure transducer in fluid connection to said hydraulic cylinder, said transducer capable of generating a signal corresponding to a pressure within said cylinder, said pressure caused solely by a supported weight of said aircraft, and wherein said at least one pressure transducer comprises a transducer with a flow-through passage, said passage having an inlet and an output;

(b) means to convert said signal to a needed information for said aircraft;

(c) means to convey said signal from said transducer to said means to convert; and (d) means to display said needed information.

2. An apparatus for use in weighing an aircraft with landing gear with at least one hydraulic cylinder incorporated into said landing gear, comprising:
(a) at least one pressure transducer in fluid connection to said hydraulic cylinder, said transducer capable of generating a signal corresponding to a pressure within said cylinder, said pressure caused solely by a supported weight of said aircraft, and wherein said at least one pressure transducer comprises a transducer with a flow-through passage, said passage having an inlet and an output;
(b) means to convert said signal to a needed information for said aircraft;
(c) means to convey said signal from said transducer to said means to convert; and
(d) means to display said needed information;
(e) a first adaptor between said transducer inlet and said hydraulic cylinder; and
(f) a second adaptor connected to said transducer output.

3. An apparatus for use in weighing an aircraft with landing gear with at least one cylinder incorporated into said aircraft's landing gear, said hydraulic cylinder accessible through a service valve, comprising:

(a) at least one pressure transducer in fluid connection with said hydraulic cylinder, said transducer containing a flow-through passage and capable of generating a signal corresponding to a pressure within said cylinder;
(b) a signal converter/display unit;
(c) a conducting cable connecting said transducer to said converter/display unit;
(d) a first adaptor for connecting said transducer to said service valve, said adaptor attached to one end of the flow-through passage and said service valve; and
(e) a second adaptor attached to the opposite end of the flow-through passage, said second adaptor configured to engage to any device designed to engage said service valve.

4. The apparatus of claim 3 wherein said signal converter/display can convert the transducer signal into the weight of the aircraft.

5. The apparatus of claim 3 wherein said signal converter/display can convert the transducer signal into a specific location defining the center of gravity of the aircraft.

* * * * *

UNITED STATES PATENT AND TRADEMARK OFFICE
CERTIFICATE OF CORRECTION

PATENT NO. : 5,258,582
DATED : November 2, 1993
INVENTOR(S) : Hilbert Junginger

It is certified that error appears in the above-indentified patent and that said Letters Patent is hereby corrected as shown below:

Title page, item [57], Abstract, lines 3 and 4, should read --Pressure-sensitive
Col. 1, line 64, should be --invention--.
Col. 3, line 43 should be -- can--.
Col. 4, line 10, should be --on-- after "used".
Col. 5, line 22, insert --hydraulic-- after "one".

Signed and Sealed this

Twenty-sixth Day of April, 1994

Attest:

BRUCE LEHMAN

Attesting Officer

Commissioner of Patents and Trademarks